United States Patent
Schultink et al.

(10) Patent No.: US 12,016,515 B2
(45) Date of Patent: *Jun. 25, 2024

(54) VACUUM CLEANER FILTER BAG WITH RECYCLED TEXTILE MATERIALS AND/OR COTTON LINERS

(71) Applicant: EUROFILTERS N.V., Overpelt (BE)

(72) Inventors: Jan Schultink, Overpelt (BE); Ralf Sauer, Overpelt (BE)

(73) Assignee: EUROFILTERS N.V., Overpelt (BE)

( * ) Notice: Subject to any disclaimer, the term of this patent is extended or adjusted under 35 U.S.C. 154(b) by 185 days.

This patent is subject to a terminal disclaimer.

(21) Appl. No.: 16/080,214

(22) PCT Filed: Mar. 15, 2017

(86) PCT No.: PCT/EP2017/056127
§ 371 (c)(1),
(2) Date: Aug. 27, 2018

(87) PCT Pub. No.: WO2017/158025
PCT Pub. Date: Sep. 21, 2017

(65) Prior Publication Data
US 2019/0059670 A1 Feb. 28, 2019

(30) Foreign Application Priority Data

| Mar. 17, 2016 | (EP) | 16160921 |
| Mar. 17, 2016 | (EP) | 16160922 |
| Jul. 11, 2016 | (EP) | 16178839 |
| Jul. 11, 2016 | (EP) | 16178856 |
| Oct. 6, 2016 | (EP) | 16192650 |
| Oct. 6, 2016 | (EP) | 16192651 |

(51) Int. Cl.
*A47L 9/14* (2006.01)
*B01D 39/16* (2006.01)

(52) U.S. Cl.
CPC ............. *A47L 9/14* (2013.01); *B01D 39/163* (2013.01); *B01D 2239/0283* (2013.01); *B01D 2239/065* (2013.01)

(58) Field of Classification Search
CPC .......... B01D 39/18; B01D 39/163; B01D 2239/065; B01D 2239/0283; B01D 2239/0435; B01D 2239/0233; B01D 2239/0225; B01D 2239/1233; A47L 9/14
See application file for complete search history.

(56) References Cited

U.S. PATENT DOCUMENTS

| 4,547,420 | A | | 10/1985 | Krueger et al. | |
| 5,390,813 | A | * | 2/1995 | Anderson | B65F 1/06 220/495.11 |
| 5,549,957 | A | * | 8/1996 | Negola | D01F 8/06 428/370 |
| 5,692,836 | A | * | 12/1997 | Mitchell | B65F 1/062 383/41 |
| 5,711,499 | A | * | 1/1998 | Sectish | B65F 1/06 220/495.1 |
| 5,881,901 | A | * | 3/1999 | Hampton | B65F 1/06 220/495.11 |
| 6,156,086 | A | | 12/2000 | Zhang | |
| 6,171,369 | B1 | * | 1/2001 | Schultink | B32B 29/02 95/57 |
| 2004/0132376 | A1 | * | 7/2004 | Haworth | D04H 1/549 442/364 |
| 2006/0079145 | A1 | | 4/2006 | Cox | |
| 2007/0130894 | A1 | * | 6/2007 | Schultink | A47L 9/14 55/381 |
| 2008/0017529 | A1 | * | 1/2008 | Herring | B65D 5/42 206/216 |
| 2009/0031683 | A1 | * | 2/2009 | Schultink | A47L 9/14 55/382 |
| 2009/0223190 | A1 | * | 9/2009 | Nauta | D04H 1/64 55/524 |
| 2010/0029161 | A1 | | 2/2010 | Pourdeyhimi | |
| 2011/0030557 | A1 | * | 2/2011 | Brownstein | D04H 1/46 95/273 |
| 2011/0036846 | A1 | * | 2/2011 | Corbett | B65D 25/16 220/495.03 |
| 2012/0131890 | A1 | * | 5/2012 | Schultink | A47L 9/14 55/368 |
| 2012/0211625 | A1 | * | 8/2012 | Schultink | A47L 9/1445 248/311.2 |
| 2012/0224947 | A1 | * | 9/2012 | Fitzpatrick | B65F 1/1468 49/460 |

(Continued)

FOREIGN PATENT DOCUMENTS

| CN | 1564885 | 1/2005 |
| CN | 101023854 | 8/2007 |

(Continued)

OTHER PUBLICATIONS

"International Application Serial No. PCT/EP2017/056127, International Search Report dated Sep. 1, 2017", (Sep. 1, 2017), 9 pgs.
"International Application Serial No. PCT/EP2017/056127, Written Opinion dated Sep. 1, 2017", (Sep. 1, 2017), 6 pgs.
Russell, S J, "Handbook of nonwovens", Woodhead publishing textiles Chapter 4.10.1, (Jan. 8, 1993), 4 pgs.
"European Application Serial No. 17 712 067.2 Office Action dated Jul. 12, 2019", (Jul. 12, 2019), 4 pgs.
"Australian Application Serial No. 2017232261, Examination Report dated Jul. 17, 2019", (Jul. 17, 2019), 3 pgs.

(Continued)

*Primary Examiner* — Dung H Bui

(74) *Attorney, Agent, or Firm* — Schwegman Lundberg & Woessner, P.A.

(57) ABSTRACT

The present invention relates to vacuum cleaner filter bags made of waste products of the textile industry. In addition, possibilities for use of waste products of the textile industry for vacuum cleaner filter bags are indicated.

23 Claims, No Drawings

(56) References Cited

U.S. PATENT DOCUMENTS

| | | | |
|---|---|---|---|
| 2013/0047856 A1* | 2/2013 | Takeuchi | A62B 23/025 96/17 |
| 2014/0120322 A1 | 5/2014 | Fu et al. | |
| 2014/0252032 A1* | 9/2014 | Corbett | B65D 11/06 222/105 |
| 2014/0278142 A1 | 9/2014 | Danes et al. | |
| 2015/0017865 A1 | 1/2015 | Schroer et al. | |
| 2019/0076766 A1* | 3/2019 | Sauer | A47L 9/14 |
| 2020/0060489 A1* | 2/2020 | Sauer | B01D 39/201 |
| 2020/0139667 A1* | 5/2020 | Menozzi | B60R 13/02 |
| 2020/0157716 A1* | 5/2020 | Vromman | D06N 7/0068 |

FOREIGN PATENT DOCUMENTS

| | | | | |
|---|---|---|---|---|
| CN | 101670209 | A | 3/2010 | |
| CN | 101684634 | | 3/2010 | |
| CN | 101747596 | A | 6/2010 | |
| CN | 102802485 | | 11/2012 | |
| CN | 103147163 | A | 6/2013 | |
| CN | 105342526 | | 2/2016 | |
| CN | 105999856 | A | 10/2016 | |
| DE | 19919809 | A1 | 11/2000 | |
| DE | 10221694 | A1 | 12/2003 | |
| DE | 202006020047 | U1 | 9/2007 | |
| DE | 202008005050 | U1 | 6/2008 | |
| DE | 202008016836 | U1 | 2/2009 | |
| DE | 102013014920 | A1 | 1/2015 | |
| EP | 0960645 | A2 | 12/1999 | |
| EP | 1198280 | A1 | 4/2002 | |
| EP | 1254693 | B1 | 11/2002 | |
| EP | 1198280 | B1 | 6/2003 | |
| EP | 1019174 | B1 | 6/2005 | |
| EP | 1402934 | B1 | 5/2007 | |
| EP | 1795247 | A1 | 6/2007 | |
| EP | 1795247 | B1 | 6/2007 | |
| EP | 1795427 | A1 | 6/2007 | |
| EP | 2161374 | A1 | 3/2010 | |
| EP | 2263507 | A1 | 12/2010 | |
| EP | 1917895 | B1 | 3/2011 | |
| EP | 2301404 | A2 | 3/2011 | |
| EP | 2433695 | A1 | 3/2012 | |
| EP | 2442703 | A1 | 4/2012 | |
| EP | 2826895 | A1 | 1/2015 | |
| EP | 2263508 | B1 | 8/2015 | |
| EP | 3305155 | A1 | 4/2018 | |
| EP | 3666360 | B1 | 9/2021 | |
| JP | H07251015 | A | 10/1995 | |
| JP | H09220419 | A | 8/1997 | |
| JP | H09276637 | A | 10/1997 | |
| JP | 2000328369 | A | 11/2000 | |
| JP | 2001172828 | A | 6/2001 | |
| JP | 2001327814 | A | 11/2001 | |
| JP | 2003334412 | A | 11/2003 | |
| JP | 2004131862 | A | 4/2004 | |
| JP | 2005060886 | A | 3/2005 | |
| JP | 2006328600 | A | 12/2006 | |
| JP | 2007254908 | A | 10/2007 | |
| KR | 20120070858 | A | 7/2012 | |
| KR | 20120133548 | A | 12/2012 | |
| KR | 20170135833 | A * | 12/2017 | F24F 8/10 |
| WO | WO-9313940 | A1 * | 7/1993 | D04H 1/4291 |
| WO | WO-9958041 | A2 | 11/1999 | |
| WO | WO-0103802 | A1 | 1/2001 | |
| WO | WO-2006044018 | A1 | 4/2006 | |
| WO | WO-2011047764 | A1 | 4/2011 | |
| WO | WO-2011057641 | A1 | 5/2011 | |
| WO | WO-2011057651 | A1 | 5/2011 | |
| WO | WO-2012025451 | A1 | 3/2012 | |
| WO | VVO-2013106392 | A3 | 9/2013 | |
| WO | WO-2014074398 | A2 | 5/2014 | |
| WO | WO-2014145804 | A1 | 9/2014 | |
| WO | WO-2014146589 | A1 * | 9/2014 | C08G 63/183 |
| WO | WO-2014146590 | A1 * | 9/2014 | C08G 63/183 |

OTHER PUBLICATIONS

"International Application Serial No. PCT/EP/2017056127 International Preliminary Report on Patentability dated Sep. 27, 2018", w/English Translation, (Sep. 27, 2018), 20 pgs.

"Chinese Application Serial No. 202111177293.7, Office Action dated Aug. 9, 2022", w/ English Translation, (Aug. 9, 2022), 10 pgs.

"European Application Serial No. 16192650.6 Notice of Opposition mailed on May 22, 2019", w/English Translation, 42 pgs.

"European Application Serial No. 20154822.9 Notice of Opposition mailed on Sep. 15, 2021", 8 pgs.

"European Application Serial No. 20154822.9 Response to Notice of Opposition mailed on Jun. 14, 2022", 27 pgs.

Curtzwiler, G.W., et al., "Certification markers for empirical quantification of post-consumer recycled content in extruded in polyethylene film", Polymer Testing 65 (2018)., (2018), 8 pgs.

Hinsken, H., et al., "Degradation of Polyolefins during melt processing", Pol. Degr. Stab. 1991, (1991), 15 pgs.

Jansson, A., et al., "Chemical degradation of polypropylene material exposed to simulated recycling", Polymer Degradation and Stability 84. (2004), (2004), 6 pgs.

La Mantia, "The Role of Additives in the Recycling of Polymers", Macromol. Symp 1998, (1998), 9 pgs.

Li, Shen, et al., ""Open-Loop Recycling; A LCA case study of PET bottle-to-fibre recycling"", Conservation and Recycling, (2010), 6 pgs.

Mansor, M.R., et al., "Thermal and Mechanical Behaviour of recycled polypropylene/ polyethylene blends of rejected unused disposable diapers", Journal of Advanced Manufacturing Technology (JAMT), 2020, (2020), 13 pgs.

Pfaender, Rudolf, et al., "Recycling and Restabilitation of Polymers for High Quality Applications. An Overview", Angew. Makromol. Chemie 1995., (1995), 36 pgs.

Pospisil, J., et al., "The origin and role of structural inhomogeneities and impurities in material recycling of plastics", Macromol. Symp. 135, (1998), (1998).

Pospisil, J., et al., "Upgrading of recycled plastics by restabilization an Overview.", Pol. Degr. Stab. 48 1995., (1995).

Qin, Yijing, et al., "Studies on recycled polyester", Textile science and clothing technology, 2019., (2019).

Romao, W., et al., "Distinguishing between virgin and post-consumption bottle-grade poly using thermal properties", Polymer Testing 29 (2010), (2010).

Stangenberg, F., et al., "Quality Assessments of recycled plastics by spectroscopy and chromatography", Chromatographia 2004., (2004).

"Chinese Application Serial No. 202111177293.7, Office Action dated Mar. 14, 2023", (Mar. 14, 2023), 23 pgs.

"Chinese Application Serial No. 201780017907.0, Office Action dated Sep. 11, 2023", w English Translation, (Sep. 11, 2023), 10 pgs.

"Chinese Application Serial No. 202111177293.7, Office Action dated Aug. 9, 2023", English Translation, (Aug. 9, 2023), 11 pgs.

* cited by examiner

VACUUM CLEANER FILTER BAG WITH RECYCLED TEXTILE MATERIALS AND/OR COTTON LINERS

PRIORITY APPLICATIONS

This application is a U.S. National Stage Filing under 35 U.S.C. 371 from International Application No. PCT/EP2017/056127, filed on Mar. 15, 2017, and published as WO2017/158025 on Sep. 21, 2017, which claims the benefit of priority to European Application No. 16160922.7, filed on Mar. 17, 2016 and European Application No. 16160921.9, filed on Mar. 17, 2016 and European Application No. 16178856.7, filed on Jul. 11, 2016 and European Application No. 16178839.3, filed on Jul. 11, 2016 and European Application No. 16192650.6, filed on Oct. 6, 2016 and European Application No. 16192651.4, filed Oct. 6, 2016; the benefit of priority of each of which is hereby claimed herein, and which applications and publication are hereby incorporated herein by reference in their entirety.

The present invention relates to vacuum cleaner filter bags made of waste products of the textile industry. In addition, possibilities for use of waste products of the textile industry for vacuum cleaner filter bags are indicated.

Filter bags made of nonwovens have, in the last 10 years, practically entirely superseded paper filter bags because of the significantly better properties of use. In particular the separating capacity, the tendency to blocking and the mechanical strength have been continuously improved. The nonwovens used for this purpose are thereby generally formed from thermoplastic plastic materials, in particular polypropylene (PP) and/or polyester (PET).

Even if there is still a further requirement to improve these properties, there is nevertheless still a sense that the high costs for the complex filter constructions are accepted less and less by the end customer.

In addition, the use of high-quality and heavy nonwovens for a disposable product is regarded ever more critically for ecological reasons.

Biodegradable filter bags, as are proposed in EP 2 301 404 and WO 2011/047764, appear also not to be a promising approach for improving the ecological properties since filter bags are often disposed of by waste incineration and composting is not possible, simply because of the predominantly non-biodegradable suctioned material.

Nonwoven filter bags for vacuum cleaners still consist nowadays of a plurality of layers (EP 1 198 280, EP 2 433 695, EP 1 254 693). In order to achieve the required mechanical strength, there are used support layers, coarse filter layers which have a high storage capacity for dust, without the air resistance increasing too greatly, and fine filter layers for filtration of particles<1 μm.

In order to increase the dust storage capacity, in addition for some years diffusers and separating walls have been inserted in filter bags, which are intended to optimise the flow ratios in the filter bag in order thus to increase the service life.

In order to manufacture these different materials, the most varied of technologies are used. Meltblown microfibre nonwovens are used as fine filter layer. These meltblown nonwovens are extrusion nonwovens, consist usually of polypropylene and have filament diameters in the range of below 1 μm up to a few μm. In order to achieve a high separating capacity, these materials are charged electrostatically (e.g. by means of corona discharge). For further improvement in the separating capacity, it has been proposed to apply nanofibres produced in the electrospinning process on nonwoven carrier materials (DE 199 19 809).

For the capacity layer, both carded staple fibre nonwovens, extrusion nonwovens but also fibrous webs (EP 1 795 247) made of staple fibres or filaments are used. As materials for capacity layers, generally polypropylene or polyester but also fluff pulp (EP 0 960 645, EP 1 198 280) are used.

The use of recycled plastic materials (e.g. recycled polyethylene terephthalate (rPET)) for fabrics was proposed in WO 2013/106392.

The use of rPET as raw material for meltblown nonwovens has been examined already (Handbook of Nonwovens, Woodhead Publishing Ltd., ed. by S. J. Russelt, chapter 4.10.1).

CN101747596 describes the use of recycled PET or recycled PBT (rPET/rPBT) as material for microfilaments.

Starting herefrom, it is hence the object of the present invention to indicate vacuum cleaner filter bags which are equal in every way to the vacuum cleaner filter bags on the market with respect to dust separation capacity and service life and hence have excellent properties of use, however consist predominantly of recycled materials or of waste materials. In particular, it is therefore the object of the present invention to produce ecologically and also economically particularly advantageous vacuum cleaner filter bags. Preferably, a proportion of recycled materials in the filter bag of at least 40% is intended to be achieved.

This object is achieved with a vacuum cleaner filter bag according to patent claim 1. The dependent patent claims thereby represent advantageous developments. With patent claim 17, possibilities of use for nonwovens which comprise dust and/or fibrous recycled material from the production of textiles, in particular cotton textiles and/or cotton linters, are mentioned for vacuum cleaner filter bags. Patent claim 18 describes a special bicomponent fibre.

The present invention hence relates to a vacuum cleaner filter bag which comprises walls, surrounding an interior, made of an air-permeable material. An inlet opening is introduced into the air-permeable material. The vacuum cleaner filter bag according to the invention is distinguished by the air-permeable material comprising at least one layer of a nonwoven which comprises dust-like and/or fibrous recycled material from the production of textiles, in particular cotton textiles and/or cotton linters.

The fibrous and/or dust-like recycled material from the production of textiles occurs in particular in the processing of textile materials, such as for example production, cutting, drying or recycling of textile materials. In particular both pre- and post-consumer textile waste materials can thereby be used as recycled materials.

For example, recycled textile materials (which occur for example in the production of textiles as cut waste) can be used for the production of fibrous and/or dust-like recycled materials. The fibrous and/or dust-like recycled material can be obtained by disintegrating the textile fibrous web from the textile material line. Preferably, the disintegration of the fibrous web is effected by tearing or by means of a hammer mill. The fibrous web is hereby disintegrated as far as the individual fibre. This material, i.e. the fibrous and/or dust-like recycled material, is also termed "torn fibre" and can be laid, for the purposes of the present invention, for example in a nonwoven laying process (in particular by means of an air-laid process or a cross-laid process (cross-lapping)) to form a fibrous web and can possibly be bound to form a nonwoven and can be used as material layer for a vacuum cleaner filter bag. Such torn fibres have, for the purposes of the present invention, an extremely positive property profile.

The mechanical stress thereof experienced during production leads to a wide fibre length spectrum with also very short fibres. Consequently, a large surface results and, consequently caused, a very large dust storage capacity. In addition, incompletely disintegrated thread- and surface pieces are present which, in this form, lead to a special and advantageous matrix formation.

Such torn fibres hence represent in particular textile fibres made of cotton, polyester, elastane, flax, linen, hemp, camel hair, llama, mohair, polyamide, polyethylene, ramie, silk, viscose, jute, coir, modal, polyacryl, polypropylene, sheep wool, sisal, goat hair and also cotton dust and also mixtures and combinations hereof.

Further possible fibrous and/or dust-like materials which are suitable for the purposes of the present invention are for example waste materials which can be deposited on the machines or filter materials used for processing textiles. The dusts or fibres are normally disposed of and used thermally.

Cotton linters are short cotton fibres which adhere to the cotton seed core after the long seed hair (cotton) has been removed from the core. Cotton linters differ greatly in fibre length (1 to 6 mm) and in the degree of purity, are not spinnable and represent, in the textile industry, normally a non-usable residue and hence a waste product. Also cotton linters can be used for the nonwovens which can be used in air-permeable materials for the vacuum cleaner filter bags according to the invention.

In the nonwoven layer or fibrous web layer which is contained in the air-permeable material, the fibrous and/or dust-like recycled material is or the cotton linters are bonded or unbonded. The nonwoven material, in contrast to a fibrous web, has passed through a binding step. The binding of the fibrous and/or dust-like recycled material and/or of the cotton linters is thereby effected preferably via binding fibres, which can for example be thermally activated, being added to the nonwoven layer.

The production of a corresponding nonwoven layer can hence be effected by for example the fibrous and/or dust-like recycled material and/or the cotton linters being laid, together with the binding fibres, in a cross-laid- or an air-laid process and subsequently—provided a nonwoven is intended to be produced from the produced fibrous web—binding to form the finished nonwoven is effected by thermal activation of the binding fibres.

In a preferred embodiment, it is provided that the layer of nonwoven comprising the at least one fibrous and/or dust-like recycled material and/or cotton linters comprises up to 95% by weight, preferably 70 to 90% by weight, of the fibrous and/or dust-like recycled material and/or cotton linters and at least 5% by weight, preferably 10 to 30% by weight, of binding fibres, in particular bicomponent fibres, or consists hereof.

The binding fibres can thereby represent, e.g. so-called "fusing fibres" which are formed from thermoplastic, meltable materials. These fusing fibres melt during thermal activation and bind the fibrous and/or dust-like recycled material or the cotton linters.

It is hereby further advantageous that the bicomponent fibres preferably used as binding fibres consist of a core, consisting of a first thermoplastic material and a shell, consisting of a second thermoplastic material which, compared with the first thermoplastic material, melts at lower temperatures, preferably the core or both core and shell consisting of a recycled plastic material or a plurality of recycled plastic materials. In a particularly preferred embodiment, the core of the previously mentioned core-shell bicomponent fibres is thereby formed from a plastic material recyclate, whilst the shell is formed from a virgin plastic material or likewise from a plastic material recyclate. For example, the core of such a bicomponent fibre can be formed from recycled PET, whilst the core is formed from virgin PP. In addition to core/shell bicomponent fibres, also the other common variants of bicomponent fibres (e.g. side by side) are possible.

The fusing fibres or bicomponent fibres used preferably as binding fibres can thereby consist partially or completely of recycled plastic materials.

A corresponding nonwoven which is produced by binding of fibrous and/or dust-like recycled materials is produced from the production of textiles and bicomponent fibres, is suitable in particular as capacity layer in a vacuum cleaner filter bag according to the invention. There can be added to such a nonwoven, also additional components, such as for example microstaple fibres, crimp staple fibres, fibres with non-round cross-sections, spinning waste etc.

In a preferred embodiment, the binding fibres are staple fibres, in particular with a length of 1 to 75 mm, preferably 2 to 25 mm.

For the purposes of the present invention, for example a nonwoven can be used, as is described in WO 2011/057651 A1. All the embodiments of this patent application are jointly adopted for the purposes of the present invention. The disclosure content of this document is likewise hence made the subject of the present application.

In a further preferred embodiment, the air-permeable material has a multilayer construction, the air-permeable material, in addition to the at least one layer of the nonwoven which comprises fibrous and/or dust-like recycled material and/or cotton linters, having at least one further layer which comprises a nonwoven and/or a fibrous web or is formed herefrom, in particular at least one, a plurality of, or all of the additional layers comprising one or more recycled plastic materials or being formed herefrom.

The term "recycled plastic material" used for the purposes of the present invention should thereby be understood synonymously to plastic material recyclates. With respect to the terminological definition, reference is hereby made to the standard DIN EN 15347:2007.

At least one of these layers is hence preferably a nonwoven or a fibrous web which comprises recycled plastic materials and is formed in particular from recycled plastic materials. In contrast to the vacuum cleaner filter bags known from the state of the art, hence less or absolutely no virgin plastic material is used for production of the nonwovens or fibrous webs forming the basis of the walls of the vacuum cleaner filter bag, but rather predominantly or exclusively plastic materials are used which were already in use or were recycled by corresponding recycling methods. Such filter bags are clearly advantageous from an ecological point of view since they can be produced neutrally to a high degree with respect to raw material. These filter bags likewise offer economic advantages since most recycled plastic materials can be obtained significantly more favourably than the corresponding raw materials which are not recycled ("virgin" plastic materials).

In the sense of the present invention, a nonwoven thereby describes a randomly laid web which has passed through a compaction step so that it has sufficient strength to be wound up or unwound to form for example rolls. A fibrous web corresponds to a randomly laid web which has however not passed through a compaction step so that, in contrast to a nonwoven, such a randomly laid web does not have sufficient strength to be wound up or unwound for example to form rolls. With respect to the definition of this terminology, reference is made to EP 1 795 427 A1, the disclosure content of which is made, in this respect, the subject of the present patent application.

According to a preferred embodiment, the fibres of the nonwoven or of the fibrous web which is included in the air-permeable material of the walls of the vacuum cleaner filter bag according to the invention is formed from a single recycled plastic material.

However, it is likewise preferred, as an alternative, if the fibres of the nonwoven or of the fibrous web are formed from different materials, at least one of which represents a recycled plastic material. In particular two embodiments are hereby conceivable.

On the one hand, of concern can be a mixture of at least two types of fibre, for example fibre mixtures which are formed from at least two different recycled plastic materials.

On the other hand, it is likewise possible that the fibrous web or the nonwoven includes bicomponent fibres (BiCo fibres) or is formed herefrom, which consist of a core and also of a shell covering the core. Core and shell are thereby formed from different materials. The bicomponent fibres can be present as staple fibres or be configured as extrusion nonwoven (for example made of meltblown nonwoven) so that the bicomponent fibres have theoretically infinite length and represent so-called filaments. It is advantageous with such bicomponent fibres if at least the core is formed from a recycled plastic material, for the shell, for example also a virgin plastic material can be used, but alternatively likewise a different recycled plastic material.

It is possible for the nonwovens or fibrous webs, for the purposes of the present invention, that they hereby concern dry-laid, wet-laid or extrusion nonwovens. Consequently, the fibres of the nonwovens or fibrous webs can have finite length (staple fibres) but also have theoretically infinite length (filaments).

In total, the construction of the walls of the filter bag according to the present invention can be configured just as described in EP 1 795 247. Such walls hence comprise at least three layers, at least two layers consisting of at least one nonwoven layer and at least one fibrous web layer, comprising staple fibres and/or filaments. The walls of the vacuum cleaner filter bag are distinguished therefore in addition by a weld joint, in which all the layers of the filter material are joined together by weld joints. The pressed surface proportion of the weld pattern thereby is at most 5% of the surface of the throughflowable surface of the filter material or of the vacuum cleaner filter bag. With respect to the total throughflowable area of the filter bag, there are present on average at most 19 weld joints per 10 cm$^2$.

For example, the air-permeable material can be configured such as is described in the introductory part of the present patent application, i.e. e.g. as in EP 1 198 280, EP 2 433 695, EP 1 254 693, DE 199 19 809, EP 1 795 247, WO 2013/106 392 or CN 101747596, as long as fibrous and/or dust-like recycled material from the production of textiles and/or cotton linters was used for production of these filter materials. With respect to the detailed construction of these filter materials, reference is made to the disclosure content of these publications which are intended to be included in this respect also in the disclosure content of the present invention.

The present invention includes several particularly preferred possibilities for multilayer configuration of the air-permeable material which are presented subsequently. The plurality of these layers can be joined together by means of weld joints, in particular as described in EP 1 795 427 A1. The layers can also be glued together or bonded as described in WO 01/003802.

In the case of the previously mentioned multilayer construction of the air-permeable material, in particular the following embodiments are advantageous.

According to a first preferred embodiment, the air-permeable material has at least one support layer and at least one capacity layer, at least one or all of the support layers representing nonwovens and/or at least one or all of the capacity layers representing nonwovens or fibrous webs which comprise a recycled plastic material or a plurality of recycled plastic materials or are formed herefrom.

Alternatively hereto, it is likewise possible that the air-permeable material has at least one support layer, at least one fine filter layer and at least one capacity layer, at least one or all of the support layers and/or at least one or all of the fine filter layers representing nonwovens which comprise a recycled plastic material or a plurality of recycled plastic materials or are formed herefrom and/or at least one or all of the capacity layers representing nonwovens or fibrous webs which comprise a recycled plastic material or a plurality of recycled plastic materials or are formed herefrom.

In the case of the two previously mentioned embodiments, it is thereby provided that at least one, preferably all of the capacity layers comprise the nonwoven characterised in more detail above, which comprises fibrous and/or dust-like recycled material and/or cotton linters, or are formed herefrom. By means of the effected nonwoven binding, the nonwoven layer configured as capacity layer thereby has such a high mechanical strength that it can also act as support layer.

It is likewise possible to make the outer layer on the clean air side from a relatively thin material based on linters and/or cotton dust. There is likewise possible, as outer layer, a spunbonded fabric which includes recycled fibrous and/or dust-like material.

A further preferred embodiment provides that the air-permeable material has an outer layer made of a spunbonded fabric, one or two fine filter layers and also an inner capacity layer. The spunbonded fabric layer thereby comprises the fibrous and/or dust-like recycled material and/or cotton linters or is formed herefrom. The fine filter layer(s) is (are) hereby formed preferably from a meltblown, in particular from a meltblown made of rPET or rPP. The capacity layer is e.g. a nonwoven which consists of torn fibres produced from textiles which are bonded with bicomponent fibres. The bicomponent fibres thereby have preferably a core made of rPET and a shell made of virgin PP.

The individual layers are thereby described in more detail corresponding to their function.

A support layer in the sense of the present invention is thereby a layer which endows the multilayer composite of the filter material with the required mechanical strength. There is termed herewith an open, porous nonwoven or a nonwoven with a light basis weight. A support layer serves primarily for supporting other layers or coatings and protecting from abrasion. The support layer can also filter the largest particles. The support layer, as also any other layer of the filter material, can possibly be charged also electrostatically, with the proviso that the material has suitable dielectric properties.

A capacity layer offers high resistance relative to impact stress, filtering large dirt particles, filtering a significant proportion of small dust particles, storing or retaining large quantities of particles, a simple throughflow being made possible for air and hence a small pressure drop resulting in the case of high particle loading. This has an effect in particular on the service life of a vacuum cleaner filter bag.

A fine filter layer serves for increasing the filtration capacity of the multilayer filter material by trapping particles which pass for example through the support layer and/or the capacity layer. In order to further increase the fine filter layer, this can be charged preferably electrostatically (e.g. by corona discharge) in order to increase in particular the separation of ultrafine dust particles.

An overview of the individual functional layers within multilayer filter materials for vacuum cleaner filter bags is offered by WO 01/003802. The air-permeable material of the walls of the vacuum cleaner filter bag according to the invention can be constructed, with respect to their construction, for example as in this patent document, with the proviso that at least one of the layers of the multilayer filter material described there for the vacuum cleaner filter bag is formed from a recycled or from a plurality of recycled plastic materials. The disclosure content of WO 01/003802 is jointly adopted likewise in the present application with respect to the construction of the air-permeable filter materials.

Special embodiments of the previously mentioned aspects of the present invention provide that every support layer is a spunbonded fabric or scrim, preferably with a grammage of 5 to 80 g/m$^2$, further preferably of 10 to 50 g/m$^2$, further preferably of 15 to 30 g/m$^2$, and/or preferably with a titre of the fibres forming the spunbonded nonwoven or scrim in the range of 0.5 dtex to 15 dtex.

Preferably, the air-permeable material has one to three support layers.

In the case of the presence of at least two support layers, it is preferred that the total grammage of the sum of all the support layers is 10 to 240 g/m$^2$, preferably 15 to 150 g/m$^2$, further preferably 20 to 100 g/m$^2$, further preferably 30 to 90 g/m$^2$, in particular 40 to 70 g/m$^2$.

Alternatively or additionally to the previously mentioned embodiments, it is likewise possible that all the support layers are formed from a recycled plastic material or from a plurality of recycled plastic materials, in particular from rPET.

In the case of the previously mentioned fine filter layers, it is advantageous if each fine filter layer is an extrusion nonwoven, in particular a meltblown nonwoven, preferably with a grammage of 5 to 100 g/m$^2$, preferably 10 to 50 g/m$^2$, in particular 10 to 30 g/m$^2$.

The air-permeable material for the purposes of the vacuum cleaner filter bag according to the invention can thereby advantageously comprise one to five fine filter layers.

In the case of the presence of at least two fine filter layers, the total grammage of the sum of all the fine filter layers can be 10 to 300 g/m$^2$, preferably 15 to 150 g/m$^2$, in particular 20 to 50 g/m$^2$.

Preferably, all the fine filter layers are formed from a recycled plastic material or a plurality of recycled plastic materials, in particular rPET.

Particularly preferred fine filter layers are hereby meltblown nonwovens which can be formed in particular from rPET. The rPET which is used can thereby be non-metallised or metallised. The rPET can originate hence for example from drinks bottles (bottle flake chips) or from metallised PET films. It is likewise possible that the meltblown nonwovens represent bicomponent meltblown nonwovens. It is hereby advantageous in particular if the core of such a bicomponent fibre consists of rPET, this core material is covered by a further thermoplastic plastic material, for example polypropylene.

Alternatively or additionally to the previously mentioned embodiments, it is likewise possible and in particular preferred if at least one, preferably all of the fine filter layers are charged electrostatically. This makes necessary that at least the surface of the fibres to be charged is formed from a dielectric material. In the case of use of metallised PET recyclate, this embodiment is then only possible within the framework of the previously mentioned bicomponent fibres in which the metallised rPET forms the core of the fibres. The electrostatic charge can thereby be effected, in particular a corona discharge.

In the previously mentioned capacity layers, it is advantageous in particular if at least one, preferably every capacity layer, is a nonwoven which comprises fibrous and/or dust-like recycled material from the production of textiles and/or cotton linters, every capacity layer having preferably a grammage of 5 to 200 g/m$^2$, further preferably of 10 to 150 g/m$^2$, further preferably of 20 to 100 g/m$^2$, in particular 30 to 50 g/m$^2$.

The air-permeable material preferably has one to five capacity layers.

In the case of the presence of at least two capacity layers, the total grammage of the sum of all the capacity layers can be 10 to 300 g/m$^2$, preferably 15 to 200 g/m$^2$, further preferably 20 to 100 g/m$^2$, in particular 50 to 90 g/m$^2$.

A particularly preferred embodiment provides the following multilayer variants for the air-permeable material, with a layer sequence viewed from the interior of the vacuum cleaner filter bag:

a support layer, at least one, preferably at least two, capacity layers, preferably one further support layer, at least one, preferably at least two, fine filter layers and also one further support layer. In the case where the capacity layer has a high mechanical strength as described above, the innermost support layer can thereby also be dispensed with.

One or two capacity layers, one or two fine filter layers (meltblown layers), a support layer (spunbonded fabric).

The support layers and/or capacity layers can thereby be formed from a nonwoven material, the fibrous and/or dust-like recycled material from the production of textiles, comprises in particular cotton textiles and/or cotton linters.

In a particularly preferred embodiment, this nonwoven material forms the at least one capacity layer, whilst the other layers comprise no fibrous and/or dust-like recycled material from the production of textiles, in particular cotton textiles and/or cotton linters.

All the layers in the previously mentioned embodiments can also be joined together by means of weld joints, in particular as described in EP 1 795 427 A1. Weld joints are however not absolutely necessary.

It is further advantageous that the vacuum cleaner filter bag has a retaining plate enclosing the inlet opening, which is formed from one or more recycled plastic materials or comprises one or more recycled plastic materials. In particular, the retaining plate is thereby formed from rPET or comprises rPET in a very high proportion, for example at at least 90% by weight. According to this preferred embodiment, a further increase in the proportion of recycled plastic materials in the vacuum cleaner filter bag is hence possible.

According to a further preferred embodiment, it is provided that in the interior at least one flow distributor and/or at least one diffuser are disposed, preferably the at least one flow distributor and/or the at least one diffuser being formed from a recycled plastic material or a plurality of recycled plastic materials or from a nonwoven which comprises fibrous and/or dust-like recycled material from the production of textiles, in particular cotton textiles and/or cotton linters. Such flow distributors or diffusers are known for example in the patent applications EP 2 263 508, EP 2 442 703, DE 20 2006 020 047, DE 20 2008 003 248, DE 20 2008 005 050. Also the vacuum cleaner filter bags according to the invention, including flow distributors, can be correspondingly configured.

Flow distributors and diffusers are hence preferably manufactured likewise from nonwovens or laminates of nonwovens. There are possible, for these elements, preferably the same materials as for the capacity- and reinforcing layers.

The recycled plastic material which can be used in special nonwoven materials or in retaining plates for the vacuum cleaner filter bags is thereby selected preferably from the group consisting of recycled polyesters, in particular recycled polyethylene terephthalate (rPET), recycled polybutylene terephthalate (rPBT), recycled polylactic acid (rPLA), recycled polyglycolide and/or recycled polycaprolactone; recycled polyolefins, in particular recycled polypropylene (rPP), recycled polyethylene and/or recycled polystyrene (rPS); recycled polyvinyl chloride (rPVC), recycled polyamides and also mixtures and combinations hereof.

Relevant international standards exist for many plastic material recyclates. For example DIN EN 15353:2007 is relevant for PET plastic material recyclates. PS recyclates are described in more detail in DIN EN 15342:2008. PE recyclates are dealt with in DIN EN 15344:2008. PP recyclates are characterised in DIN EN 15345:2008. PVC recyclates are described in more detail in DIN EN 15346:2015. For the purposes of the corresponding special plastic material recyclates, the present patent application adopts the definitions of these international standards. The plastic material recyclates can thereby be non-metallised. An example of this is plastic material flakes or chips recycled from PET drinks bottles. Likewise, the plastic materials recyclates can be metallised, e.g. if the recyclates were obtained from metallic plastic material films, in particular metallised PET films (MPET).

The recycled plastic material concerns in particular recycled polyethylene terephthalate (rPET) which was obtained for example from drinks bottles, in particular from so-called bottle flakes, i.e. pieces of ground drinks bottles.

The recycled plastic materials, in particular the recycled PET, both in the metallised and in the non-metallised version, can be spun to form corresponding fibres from which the corresponding staple fibres or meltblown or spunbonded nonwovens can be produced for the purposes of the present invention.

A particularly preferred embodiment provides that the weight sum of the cotton linters and of the possibly present recycled materials, relative to the total weight of the vacuum cleaner filter bag, is at least 25%, preferably at least 30%, further preferably at least 40%, further preferably at least 50%, further preferably at least 60%, further preferably at least 70%, further preferably at least 80%, further preferably at least 90%, in particular at least 95%. Hence all of the classifications prescribed by the Global Recycle Standard (GRS) of Textile Exchange can be achieved.

The vacuum cleaner filter bag according to the present invention can be configured for example in the form of a flat bag, a side-fold bag, a block-base bag or a 3D bag, such as for example a vacuum cleaner filter bag for an upright vacuum cleaner. A flat bag thereby has no side walls and is formed from two material layers, the two material layers being joined together directly along their circumference, for example being welded or glued. Side-fold bags represent a modified form of a flat bag and comprise side folds which are fixed or can be turned out. Block-base bags comprise a so-called block base which generally forms the narrow side of the vacuum cleaner filter bag; on this side, generally a retaining plate is disposed.

In addition, the invention relates to the use of nonwovens which comprise fibrous and/or dust-like recycled material from the production of textiles, in particular cotton textiles and/or cotton linters, for vacuum cleaner filter bags. With respect to the special configuration of such nonwovens, reference is made to the preceding embodiments.

The present invention is explained in more detail with reference to the subsequent embodiments, given by way of example, without restricting the invention to the special represented embodiments.

Filter bags are designed which have one or more layers made of an air-laid nonwoven. In addition, the subsequently described filter bags according to the invention can have one or more layers of rPET filaments or rPET staple fibres which are formed from cotton dust and bicomponent fibres. The different nonwovens are thereby suitable only for specific material layers. In order to increase the proportion of recycled raw materials even further, also the use of a retaining plate is possible in addition, which retaining plate consists of rPET or at least comprises rPET.

With respect to the individual filter layers:
as support layers, in particular spunbonded nonwoven layers made of rPET with a basis weight of 5 to 50 g/m$^2$ and a titre of 1 dtex to 15 dtex are possible. As raw material, PET waste (e.g. punched waste) and so-called bottle flakes, i.e. pieces of ground drinks bottles, are used. In order to mask the different colouration of the waste, it is possible to dye the recyclate. As thermal binding process for compacting the spunbonded fabric to form a spunbond, in particular the HELIX® (Comerio Ercole) method is advantageous.

As fine filter layers, one or more layers of meltblown made of rPET with a basis weight of respectively 5 to 30 g/m$^2$ are used. In addition, also one or more meltblown nonwoven layers made of PP are present. At least this/these layer(s) are charged electrostatically by a corona discharge. The layers made of rPET can likewise be charged electrostatically. It should thereby be taken into account merely that no metallised PET waste is used then for the manufacture. Alternatively, the meltblown filaments can also consist of bicomponent fibres in the case of which the core is formed from rPET and the shell from a plastic material which can be charged electrostatically particularly well (e.g. PP, PC, PET).

One or more capacity layers comprise rPET staple fibres or rPET filaments or are produced on the basis of cotton dust and bicomponent fibres. For the production of capacity layers, different processes are suitable. Carding processes or air-laid processes in which firstly staple fibres are laid down are common, which are then usually compacted to form a nonwoven in a nonwoven binding step (e.g. by needle-felting, water-jet compaction, ultrasonic calendering or also by means of thermal compaction in continuous ovens also by means of bicomponent fibres or binding fibres). For the calendering, in particular the HELIX® (Comerio Ercole) process is advantageous.

Likewise, a process is used, in which the primarily produced fibrous web is not compacted but is bonded to form a nonwoven with as few weld points as possible. This process is however not suitable for the variant made of cotton dust. It is possible in both processes to use staple fibres made of rPET. Capacity layers can also be manufactured as extrusion nonwovens or extrusion fibrous webs. For these nonwovens, use of rPET can likewise be achieved without difficulty.

The filaments or staple fibres can also consist of bicomponent materials in which the core is formed from rPET and the shell from a plastic material which can be charged electrostatically particularly well (e.g. PP, PC, PET).

Alternatively or additionally, also one or more layers of an air-laid nonwoven can be present, which is formed from bicomponent fibres and cotton dust.

A basis weight of the individual capacity layers is preferably between 10 and 100 g/m².

The differently produced capacity layers can of course also be combined with each other.

In order to increase the proportion of recyclates further, the use of a retaining plate made of rPET is possible. If the seal for the vacuum cleaner connection pipe is taken over by the bag material, the retaining plate can also consist exclusively of rPET. In the case where the retaining plate must take over the sealing function, a TPE gasket can be moulded or glued on.

When using all possibilities, a proportion of recyclates or waste materials of up to 96% is thus possible. The following tables show some concrete embodiments with a recyclate proportion of 61% to 89%.

From the various recyclate-containing nonwovens or fibrous webs, the subsequently represented vacuum cleaner filter bags were designed using the indicated materials, the precise composition or construction of which is reproduced in the following tables. The vacuum cleaner filter bags thereby represent flat bags of rectangular geometry which have a dimension of 300 mm×280 mm.

EXAMPLE 1

|  | Grammage [g/m²] | Weight per bag [g] | Proportion of recyclate [%] |
| --- | --- | --- | --- |
| Support layers outside | 25 | 4.2 | 100 |
| Meltblown | 15 | 2.5 | 0 |
| Meltblown | 15 | 2.5 | 0 |
| Support layer centrally | 17 | 2.9 | 100 |
| Capacity layer C | 35 | 5.9 | 80 |
| Capacity layer D | 35 | 5.9 | 80 |
| Support layer inside | 15 | 2.5 | 100 |
| Retaining plate |  | 5.0 | 0 |
| Total filter bag |  | 31.4 | 60.5 |

The vacuum cleaner filter bag according to Example 1 is thereby likewise formed from a 7-layer air-permeable material. A support layer (outside) is hereby disposed on the clean-air side, on which, in the direction of the interior, two fine filter layers (meltblown on virgin PP) abut. The two meltblown layers are enclosed by a further support layer. Two capacity layers C and D abut hereon and are enclosed in a seal by a support layer situated on the dirty air side (inside). The capacity layer C and D is thereby formed from a nonwoven material which is formed up to 80% by weight from cotton dust and up to 20% from BiCo binding fibre. This nonwoven material is described in detail in WO 2011/057641 A1. The proportion of cotton dust in the capacity layers is thereby added to the total proportion of recyclate.

With such an embodiment, a proportion of recycled material, i.e. the sum of recycled plastic materials, and also cotton dust of 60.5% by weight, relative to the total vacuum cleaner filter bag, is achieved.

EXAMPLE 2

|  | Grammage [g/m²] | Weight per bag [g] | Proportion of recyclate [%] |
| --- | --- | --- | --- |
| Support layers outside | 25 | 4.2 | 100 |
| Meltblown | 15 | 2.5 | 0 |
| Meltblown | 15 | 2.5 | 0 |
| Support layer centrally | 17 | 2.9 | 100 |
| Capacity layer A | 35 | 5.9 | 100 |
| Capacity layer D | 35 | 5.9 | 80 |
| Support layer inside | 15 | 2.5 | 100 |
| Retaining plate |  | 5.0 | 0 |
| Total filter bag |  | 31.4 | 64.3 |

The vacuum cleaner filter bag according to Example 2 is thereby constructed analogously to the vacuum cleaner filter bag according to Example 1. The outer capacity layer thereby corresponds to a capacity layer according to Examples 6 to 8, i.e. to a carded staple fibre nonwoven which is formed up to 100% from fibres made of recycled PET. The recyclate proportion of a finished vacuum cleaner filter bag corresponds to 64.3% by weight.

EXAMPLE 3

|  | Grammage [g/m²] | Weight per bag [g] | Proportion of recyclate [%] |
| --- | --- | --- | --- |
| Support layers outside | 25 | 4.2 | 100 |
| Meltblown | 15 | 2.5 | 0 |
| Meltblown | 15 | 2.5 | 0 |
| Support layer centrally | 17 | 2.9 | 100 |
| Capacity layer C | 35 | 5.9 | 80 |
| Capacity layer D | 35 | 5.9 | 80 |
| Support layer inside | 15 | 2.5 | 100 |
| Retaining plate |  | 5.0 | 100 |
| Total filter bag |  | 31.4 | 76.4 |

The vacuum cleaner filter bag according to Example 3 corresponds to a vacuum cleaner filter bag according to Example 1 with the difference that the retaining plate is formed up to 100% from rPET. The total proportion of recycled materials in this vacuum cleaner filter bag is 76.4% by weight.

EXAMPLE 4

|  | Grammage [g/m²] | Weight per bag [g] | Proportion of recyclate [%] |
| --- | --- | --- | --- |
| Support layers outside | 25 | 4.2 | 100 |
| Meltblown | 15 | 2.5 | 80 |
| Meltblown | 15 | 2.5 | 80 |
| Support layer centrally | 17 | 2.9 | 100 |
| Capacity layer C | 35 | 5.9 | 80 |
| Capacity layer D | 35 | 5.9 | 80 |
| Support layer inside | 15 | 2.5 | 100 |
| Retaining plate |  | 5.0 | 100 |
| Total filter bag |  | 31.4 | 89.3 |

The vacuum cleaner filter bag according to Example 4 corresponds to the vacuum cleaner filter bag according to Example 3, with the difference that the two fine filter layers are formed from a bicomponent meltblown with a core made of rPET and a shell made of polypropylene. The total proportion of recyclate of such a vacuum cleaner filter bag is 89.3% by weight.

The present invention relates in addition to a special bicomponent fibre which is suitable in particular for the production of a nonwoven which comprises a fibrous and/or dust-like recycled material from the production of textiles. This bicomponent fibre is thereby used for binding the fibrous and/or dust-like recycled material. This bicomponent fibre is of the core-shell type (core-core-bicomponent fibre) and comprises a core made of a recycled plastic material which represents in particular recycled polyethylene terephthalate (rPET) or recycled polypropylene (rPP).

A preferred embodiment provides that the shell is formed from a virgin plastic material, in particular polypropylene.

The shell can hereby comprise the charge-persistence additives, in particular magnesium stearate.

The weight proportion of the core, relative to the total fibre, is preferably from 50 to 95% by weight.

In particular, the bicomponent fibre has a diameter of 0.5 to 10 μm. The bicomponent fibre hereby has in particular a circular cross-section.

The invention claimed is:

1. A vacuum cleaner filter bag, comprising:
   a wall surrounding an interior, the wall made of an air-permeable material and defining at least a portion of an inlet opening, wherein the air-permeable material comprises at least one of: at least one layer of a nonwoven or at least one layer a fibrous web, which comprises:
   at least one of: a fibrous or a dusty recycled material from the production of at least one of: a textile or a cotton linter;
   wherein the at least one layer of the nonwoven or the at least one layer of the fibrous web comprises up to 95% by weight of the at least one of the fibrous or dusty recycled material and at least 5% by weight of a binding fiber, wherein the binding fiber is a bicomponent fiber of a core-sheath type, wherein the core is formed and consists of a recycled plastic, and wherein the sheath includes at least one of a virgin plastic or a recycled plastic, wherein the core comprises a first thermoplastic material and the sheath comprises a second thermoplastic material, wherein the second thermoplastic material has a lower melting temperature than the first thermoplastic material, and wherein at least one of the core or the sheath comprises a recycled plastic material or a plurality of recycled plastic materials, and wherein the vacuum cleaner filter bag further comprises:
   a retaining plate enclosing the inlet opening, wherein the retaining plate is formed from one or more recycled plastic materials or comprises one or more recycled plastic materials, wherein the one or more recycled plastic materials includes at least one of a recycled polyester, a recycled polyolefin, a recycled polyvinyl chloride (rPVC); a recycled polyamides or a mixture or combination thereof, wherein the recycled polyester includes at least one of: recycled polyethylene terephthalate (rPET), recycled polybutylene terephthalate (rPBT), recycled polylactic acid (rPLA), recycled polyglycolide, or recycled polycaprolactone; and wherein the recycled polyolefin includes at least one of: recycled polypropylene (rPP), recycled polyethylene, or recycled polystyrene (rPS).

2. The vacuum cleaner filter bag according to claim 1, wherein the at least one of the fibrous or dusty recycled material is selected from the group consisting of textile fibers made of at least one of: cotton, polyester, elastane, flax, linen, hemp, camel hair, llama, mohair, polyamide, polyethylene, ramie, silk, viscose, jute, coir, modal, polyacryl, polypropylene, sheep wool, sisal, goat hair, or cotton dust, or a mixture/combination thereof.

3. The vacuum cleaner filter bag according to claim 1, wherein the binding fiber includes a staple fiber with a length of 2 mm to 75 mm.

4. The vacuum cleaner filter bag according to claim 1, wherein the binding fiber includes a core consisting of a first thermoplastic material and a shell consisting of a second thermoplastic material, wherein the second thermoplastic material has a lower melting temperature than the first thermoplastic material, and wherein at least one of the core or the shell consists of a recycled plastic material or a plurality of recycled plastic materials.

5. The vacuum cleaner filter bag according to claim 1, wherein the air-permeable material includes a second layer, wherein the second layer is at least one of: a second layer of nonwoven or a second layer of a fibrous web formed from a recycled plastic material.

6. The vacuum cleaner filter bag according to claim 1, further comprising:
   at least one of: at least one flow distributor at least one diffuser disposed in the interior, wherein the at least one flow distributor or the at least one diffuser are formed from at least one of: a recycled plastic material, a plurality of recycled plastic materials, or from a nonwoven which comprises at least one of a fibrous or a dusty recycled material from the production of a textile, wherein the textile is at least one of: a cotton textile or a cotton linter.

7. The vacuum cleaner filter bag according to claim 1, wherein a weight proportion of the fibrous or dusty recycled material relative to a total weight of the vacuum cleaner filter bag, is at least 25%.

8. The vacuum cleaner filter bag according to claim 1, in the form of a flat bag, a block-base bag, or a 3D bag.

9. The vacuum cleaner filter bag according to claim 1, wherein:
   the air-permeable material comprises at least one spunbonded fabric layer, at least one fine filter layer and at least one capacity layer,
   or
   the air-permeable layer comprises at least one support layer and at least one capacity layer, wherein at least one or all of the support layers are formed from a nonwoven or at least one or all of the capacity layers are formed from at least one of a nonwoven or a fibrous web which comprise a recycled plastic material or a plurality of recycled plastic materials, or are formed therefrom,
   or
   at least one support layer, at least one fine filter layer and at least one capacity layer, wherein at least one or all of the support layers or at least one or all of the fine filter layers are formed from a nonwoven formed from at least one of: a recycled plastic material or a plurality of recycled plastic materials, wherein at least one of the capacity layers comprising the nonwoven which comprises at least one of: a fibrous or a dusty recycled material or a cotton linter, or are formed therefrom.

10. The vacuum cleaner filter bag according to claim 9, wherein:
a) every support layer is a spunbonded fabric or scrim, with at least one of a grammage of 5 to 80 g/m2, or with a titre of the fibers forming the spunbonded fabric or scrim in a range of 0.5 dtex to 15 dtex,
b) the air-permeable material comprises 1 to 3 support layers,
c) in the case of the presence of at least two support layers, a total grammage of a sum of all the support layers is 10 to 240 g/m2 or
d) all the support layers are formed from a recycled plastic material or from a plurality of recycled plastic materials.

11. The vacuum cleaner filter bag according to claim 9, wherein:
a) each fine filter layer is an extrusion nonwoven with a grammage of 5 to 100 g/m2,
b) the air-permeable material comprises 1 to 5 fine filter layers,
c) in the case of the presence of at least two fine filter layers, a total grammage of a sum of all of the fine filter layers is 10 to 300 g/m2,
d) at least one of the fine filter layers are formed from at least one of: a recycled plastic material or a plurality of recycled plastic materials, or
e) at least one of the fine filter layers are charged electrostatically.

12. The vacuum cleaner bag according to claim 11, wherein the extrusion nonwoven is a melt-blown nonwoven.

13. The vacuum cleaner filter bag according to claim 9, wherein
a) at least one capacity layer is a nonwoven which comprises at least one of a fibrous, or a dusty recycled material from the production of textiles, and/or cotton linters, every capacity layer having a grammage of 5 to 200 g/m2,
b) the air-permeable material has 1 to 5 capacity layers, and/or
c) in the case of the presence of at least two capacity layers, a total grammage of a sum of all the capacity layers is 10 to 300 g/m2.

14. The vacuum cleaner filter bag according to claim 9, wherein the air-permeable material has a multilayer configuration, with a layer sequence, viewed from the interior of the vacuum cleaner filter bag:
a support layer, at least one capacity layer, a further support layer, at least one fine filter layer and also one further support layer.

15. A method of manufacturing a vacuum cleaner filter bag, the method comprising:
forming the vacuum cleaner bag with at least one layer of a nonwoven which includes at least one of: a fibrous or dusty recycled material from the production of a textile, wherein the textile is at least one of: a cotton textile or a cotton linter, for vacuum cleaner filter bags;
wherein the at least one layer of the nonwoven comprises up to 95% by weight of the at least one of the fibrous or dusty recycled material and at least 5% by weight of a binding fiber, and wherein the binding fiber is a bicomponent fiber of a core-sheath type, wherein the core is formed and consists of a recycled plastic, and wherein the sheath includes at least one of a virgin plastic or a recycled plastic, wherein the core comprises a first thermoplastic material and the sheath comprises a second thermoplastic material, wherein the second thermoplastic material has a lower melting temperature than the first thermoplastic material, and wherein at least one of the core or the sheath comprises a recycled plastic material or a plurality of recycled plastic materials, and wherein the vacuum cleaner filter bag comprises a retaining plate enclosing the inlet opening, wherein the retaining plate is formed from one or more recycled plastic materials or comprises one or more recycled plastic materials, wherein the one or more recycled plastic materials includes at least one of a recycled polyester, a recycled polyolefin, a recycled polyvinyl chloride (rPVC); a recycled polyamides or a mixture or combination thereof, wherein the recycled polyester includes at least one of: recycled polyethylene terephthalate (rPET), recycled polybutylene terephthalate (rPBT), recycled polylactic acid (rPLA), recycled polyglycolide, or recycled polycaprolactone; and wherein the recycled polyolefin includes at least one of: recycled polypropylene (rPP), recycled Polyethylene, or recycled polystyrene (rPS).

16. The vacuum cleaner filter bag according to claim 1, wherein the binding fiber is a bicomponent fiber of a core-shell type comprising:
a core made of a recycled plastic material.

17. The vacuum cleaner filter bag according to claim 16, wherein the shell is formed from a virgin plastic material.

18. The vacuum cleaner bag according to claim 17, wherein the virgin plastic material is polypropylene.

19. The vacuum cleaner bag according to claim 16, wherein the shell comprises a charge-persistence additive.

20. The vacuum cleaner bag according to claim 19, wherein the charge-persistence additive is magnesium stearate.

21. The vacuum cleaner bag according to claim 16, wherein a weight proportion of the core of the bicomponent fiber, relative to a total fiber, is from 50 to 95% by weight.

22. The vacuum cleaner bag according to claim 16, wherein a diameter of the bicomponent fiber is 0.5 μm to 10 μm.

23. The vacuum cleaner bag according to claim 16, wherein the core made of a recycled material is formed from at least one of: recycled polyethylene terephthalate (rPET) or recycled polypropylene (rPP).

* * * * *

UNITED STATES PATENT AND TRADEMARK OFFICE
CERTIFICATE OF CORRECTION

| | | |
|---|---|---|
| PATENT NO. | : 12,016,515 B2 | Page 1 of 1 |
| APPLICATION NO. | : 16/080214 | |
| DATED | : June 25, 2024 | |
| INVENTOR(S) | : Schultink et al. | |

It is certified that error appears in the above-identified patent and that said Letters Patent is hereby corrected as shown below:

In the Claims

In Column 13, Line 61, in Claim 1, delete "polyamides" and insert --polyamide;-- therefor In Column 16, Line 25, in Claim 15, delete "polyamides" and insert --polyamide;-- therefor In Column 16, Lines 32-33, in Claim 15, delete "Polyethylene," and insert --polyethylene,-- therefor In Column 16, Line 42, in Claim 19, delete "claim 16 ," and insert --claim 16,-- therefor In Column 16, Line 47, in Claim 21, delete "claim 16 ," and insert --claim 16,-- therefor In Column 16, Line 50, in Claim 22, delete "claim 16 ," and insert --claim 16,-- therefor Signed and Sealed this
Seventh Day of January, 2025

Derrick Brent
*Acting Director of the United States Patent and Trademark Office*